Patented Feb. 19, 1946

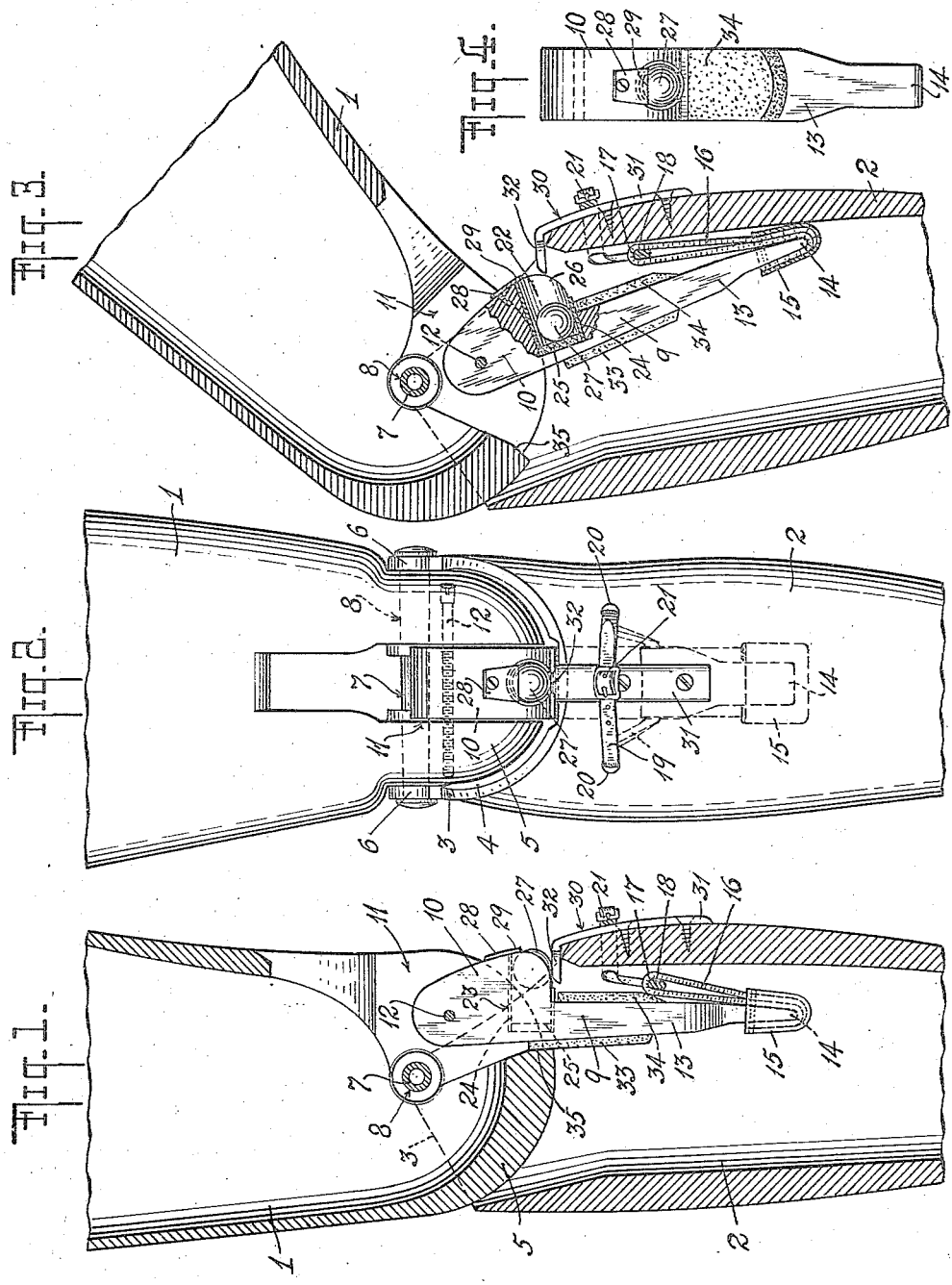

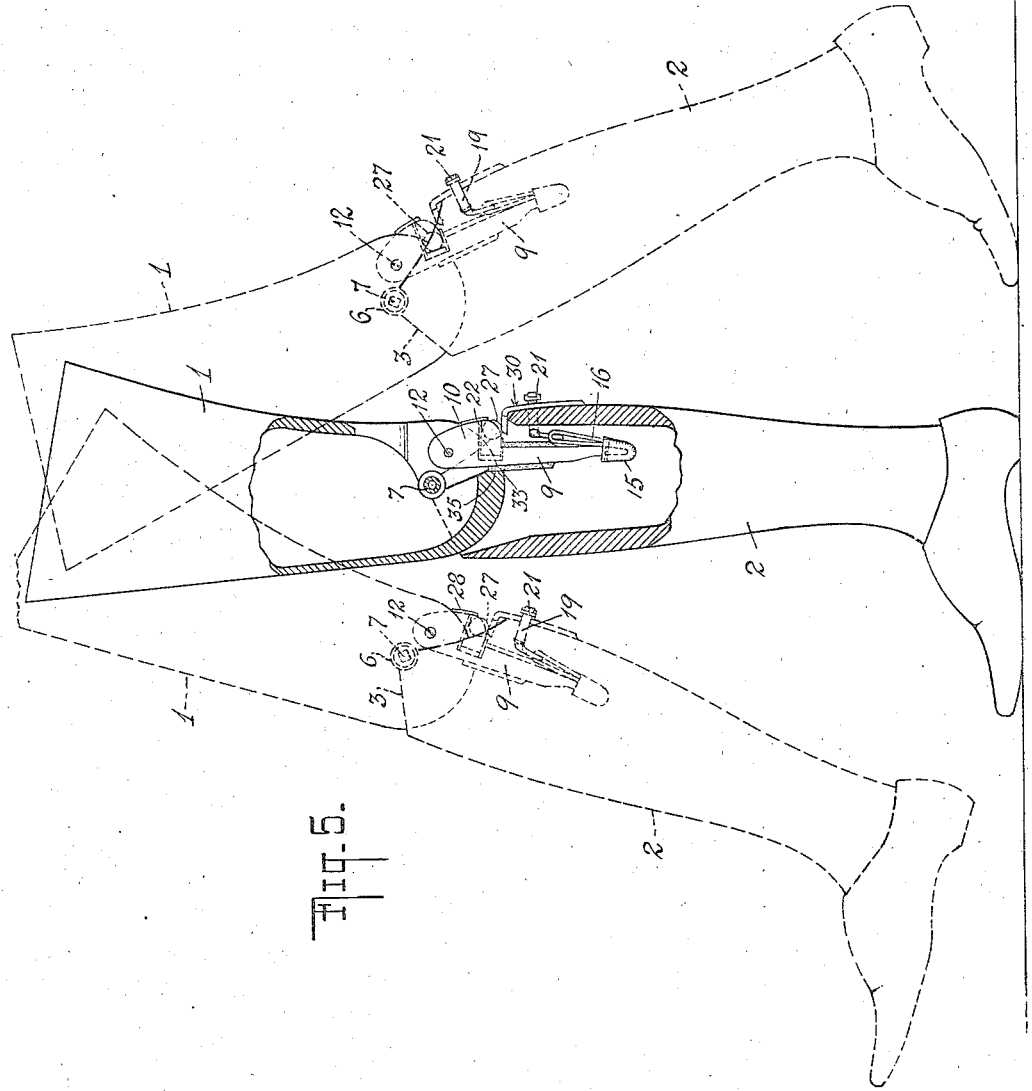

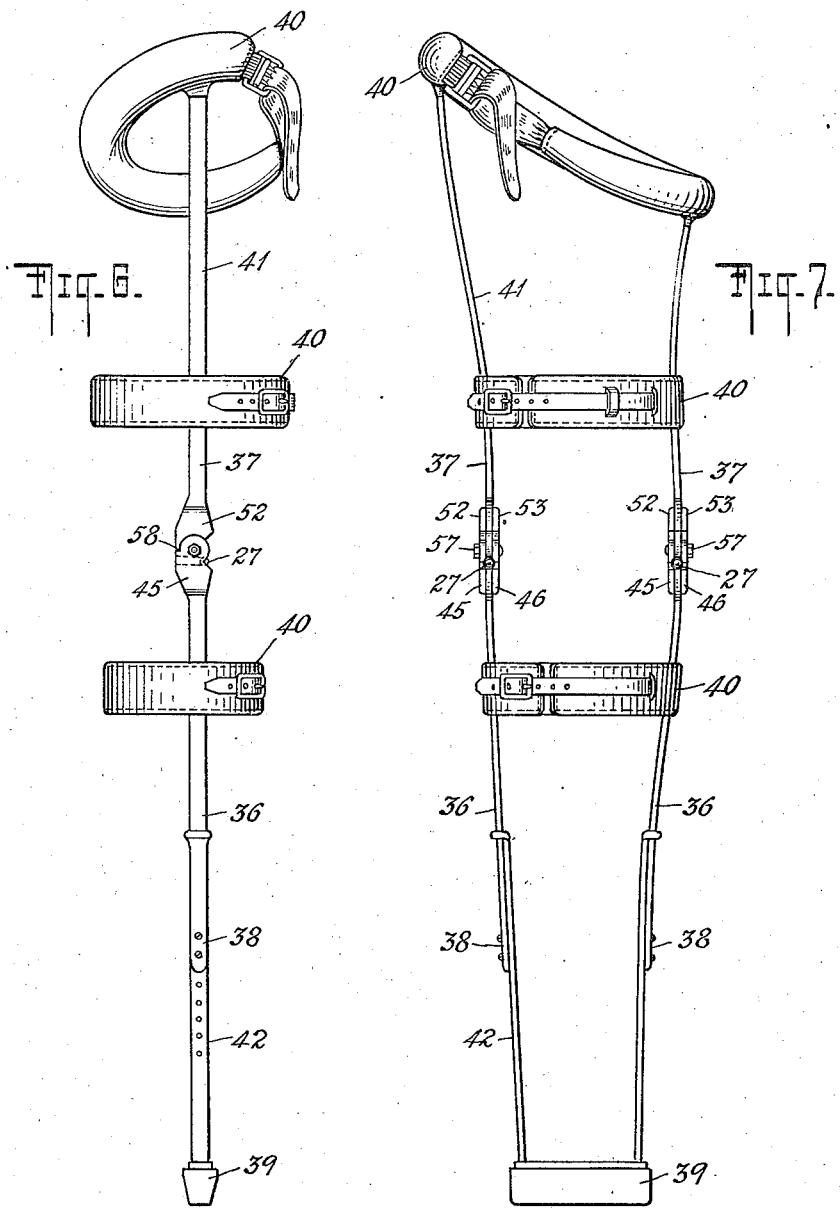

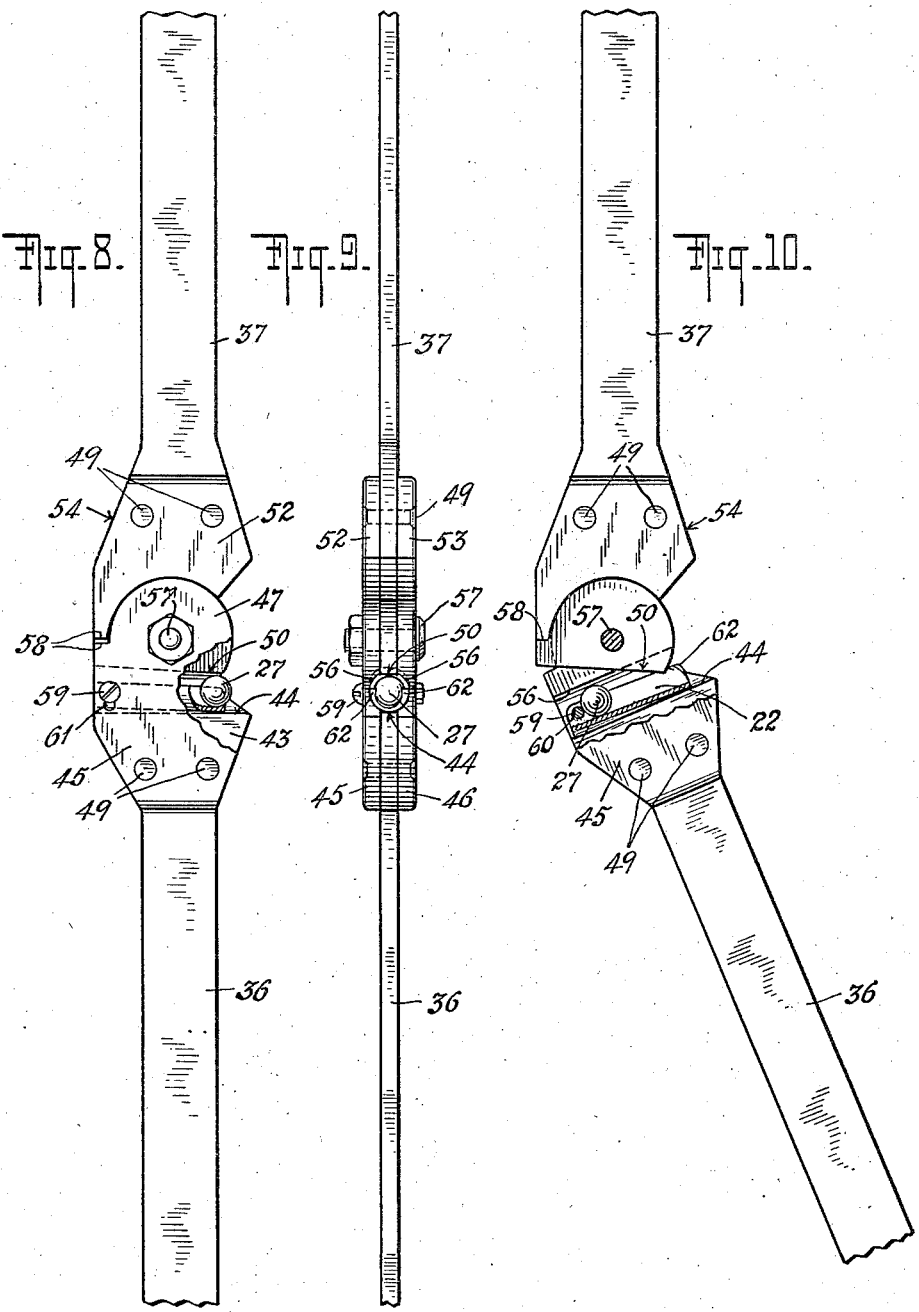

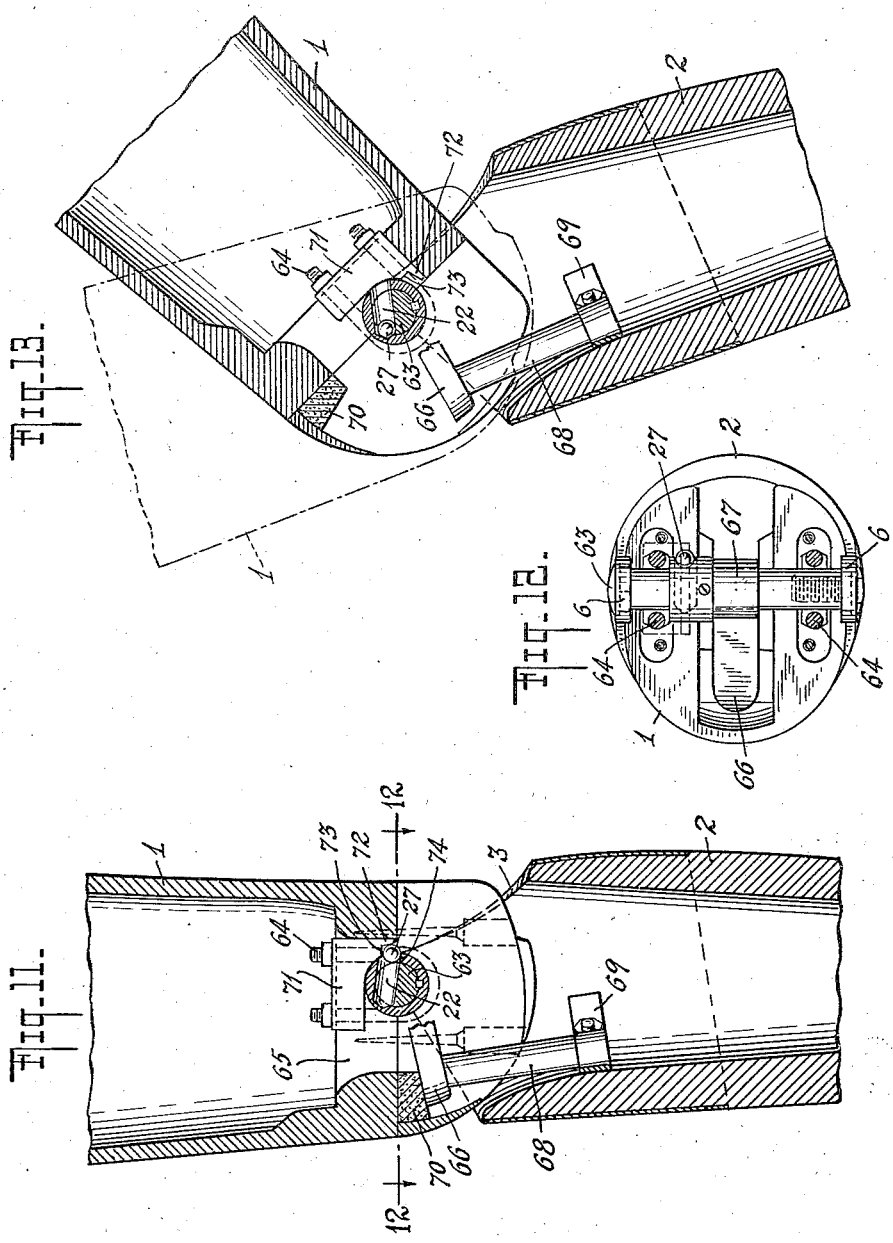

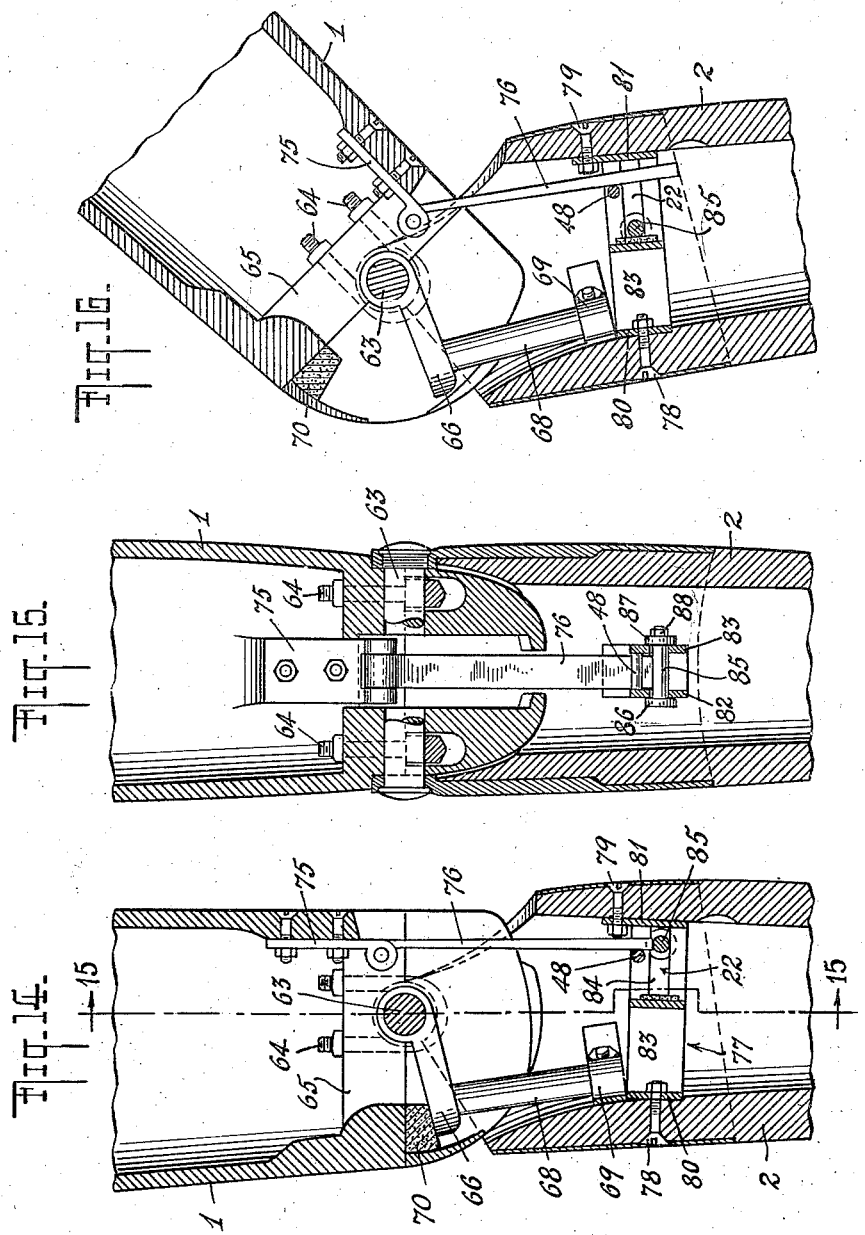

2,395,120

UNITED STATES PATENT OFFICE 2,395,120

ARTIFICIAL LIMB AND BRACE

George A. Hinkle, New York, N. Y., assignor to C. H. Bennington Mfg. Co. Inc., Hempstead, N. Y., a corporation of New York Application June 7, 1944, Serial No. 539,085

9 Claims. (Cl. 3—2)

This invention relates to artificial limbs and braces.

The object of the invention is to provide an artificial limb, particularly for a person who has lost a leg, including the knee joint, and has remaining but a stub of the thigh. The construction of this invention permits the user to walk with a natural motion and with ordinary steps, the elements of the invention acting and functioning in a mechanical way, simulating the action of the lost muscles, ligaments and other adjuncts which in the human body normally control locomotion. The structure of the invention is automatic and action of the mechanical elements is controlled as the user advances step by step.

In a modification, the principle of operation is also shown associated with leg braces, for persons who have their natural limbs but have lost control thereof and are unable to stand or walk without assistance such as a walking stick, crutches or support by another individual.

In the drawings, Fig. 1 is a vertical section of the major portions of an artificial leg; Fig. 2 is a rear elevational view of the structure of Fig. 1; Fig. 3 is a view similar to Fig. 1 with the parts in angular relation; Fig. 4 is a detailed rear face view of the support carrying a part of the locking member; Fig. 5 represents three positions, of an artificial limb, embodying this invention during walking; Fig. 6 is a side elevation of a leg brace embodying this invention on both side brace members; Fig. 7 is a rear view of the brace of Fig. 6; Fig. 8 is an enlarged detail of the portion of the brace of Fig. 6 showing the incorporation of this invention at the knee portion; Fig. 9 is a rear face view of Fig. 8; Fig. 10 is a view similar to Fig. 8 with the parts in angular relation; Fig. 11 is a vertical section of a modification of this invention; Fig. 12 is a horizontal view on line 12—12 of Fig. 11; Fig. 13 is a view similar to Fig. 11 with the parts in angular relation; Fig. 14 is a vertical section of a further modification of the invention; Fig. 15 is a vertical section on line 15—15 of Fig. 14; Fig. 16 is a view similar to Fig. 14 with the parts in angular relation.

The invention is illustrated in a number of modifications, the preferred form of structure being shown in Figs. 1–4.

The thigh member 1 consists of the usual hollow member, the upper portion whereof is socketed to provide means for attaching the thigh member to the stub of the human thigh. Such thigh members, and, in fact, artificial legs, in their length and proportions, are constructed and fitted for the requirements of each individual and consequently the thigh stub and its socket are not illustrated in the drawings. The leg member 2, in its contour and size, is likewise prepared to meet the requirements of the particular individual who is to utilize it, but this invention can be incorporated in artificial limbs without regard as to the specifications of the size and contour of the thigh and leg portion required for the individual user. The leg member 2 is provided with a metal bracket 3 suitably secured in the leg member 2, providing a recess 4 into which the rounded terminal 5 of the thigh member 1 enters. The bracket 3 is provided with bearings 6, a bolt 7 passing through the apertures of the bearings 6 and through a circular slot 8, thereby providing a hinge by which relative movement is permitted between the thigh member 1 and the leg member 2. A support 9, preferably made of a suitable hard wood, is provided at its upper end with an enlargement 10, located within the recess 11 in the lower portion of the thigh member and secured to the lower portion of the thigh member, in a radial direction in respect to the bolt 7, by the bolt 12 which passes through the lower solid portion of the thigh member, however, permitting the support 9 to pivot on the thigh member and further permitting relative movement of the thigh and leg members by reason of the enlargement of the recess 11 on both sides thereof. The support 9 has a depending arm 13 which is integral with the enlargement 10, and the free end 14 thereof fits into a pocket 15 formed of strong resilient elastic webbing. The webbing is provided with a double loop 16, the fold 17 whereof is supported in the loop 18 of the leather strap 19 which passes through the apertures 20 in the wall of the leg member 2. The strap member, in the illustration shown in the drawings, is provided with a tongue, and buckle 21, in order that it may be secured in position in respect to the leg member 2. It will be noted that when the longitudinal axis of the thigh member and the leg member are in line (Fig. 1), the amount of tension on the elastic webbing is not as great as when the members 1 and 2 take an angular relation, in which case there is increased pressure on the webbing and it is stretched somewhat further by reason of the thrust of the support 9 within the pocket 15 (Fig. 3). It is evident that, the greater the angle of relation between the thigh member 1 and the leg member 2, the resistance exercised by the elastic webbing is increased, which is desirable from the point of view of the user. The arrangement and relation of the parts just described are set forth merely as an example of an artificial limb in connection with which this invention will function and is not intended to be a limitation upon the scope of this invention.

The support 9 is provided with a guideway 22 which, in the form shown in Figs. 1–4, comprises a circular hole 23 lined with a metal cylinder 24 and at its inner end with a section of felt 25. The guideway has an open end 26 and provides a raceway for a rolling member 27 which, as is shown in Figs. 1–4, is in the form of a ball bearing. The support 9 is provided with a metal stop 28 secured by suitable fastening means to the outside face of the support 9. The stop 28 has a lip 29 overlapping, a slight distance, the open end 26 of the guideway 22, which lip 29 ensures the retention of the rolling member 27 in the guideway 22. A lock 30 is secured to the outer surface of the leg member 2 and comprises a plate 31 secured by screws to the leg and an inward directing jamming member 32 which lies in the path of the rolling member 27 when it approaches the open end 26 of the guideway 22. The guideway 22 is cut away at its lower end in order that the jamming member 32, when the rolling member 27 is near the open end 26, will have its top face lying substantially in alignment with the lower surface of the guideway 22 and in the path of the rolling member when the member 2 is in a vertical position as shown in Fig. 1.

The guideway 22 is set at a very slight angle to the horizontal in order that the rolling member 27 will tend to move toward the open end 26 of the guideway 22 when the leg is in substantial vertical position as, for instance, when the wearer is standing firmly upon both feet. In this position, the section of felt 33 on the support 9 engages the face 35 of the terminal 5 of the thigh member 1 and consequently there can be no rearward movement of the knee of the artificial limb, the engagement of the support 9 and the face 35 acting as a backstop. In fact, this latter construction eliminates rearward movement of the knee of the artificial limb, such rearward movement being no more desirable in an artificial limb than it is in a properly functioning human knee joint. A section of felt, leather, rubber or other noise-absorbing material 34, is secured opposite the felt 33, on the support 9, in order that there should be resilient contact with such parts of the device as contact the member 9.

It is evident, from an examination of Fig. 1, that when the rolling member 27 is near the open end 26 of the guideway 22, the lock 30 supports the rolling member by the rolling member coming into contact with the jamming membr 32 of the lock. The rolling member has just enough clearance in the guideway 22 to permit it to freely roll to locking position, at which position it will jam between the lock and the top wall of the guideway 22 and consequently the thigh member and the leg member are in locked relation as shown in Fig. 1. In order to reverse the angle of inclination of the guideway 22, it is evident that the rolling member will move from locking to unlocking position.

Fig. 5 shows three positions illustrative of the operation and functioning of this invention during step by step movement while walking. The central member of Fig. 5 which is in solid lines, shows substantially the same position of parts as shown in Fig. 1 of the drawings, and can be taken to illustrate the relation of the parts when the wearer is standing in an upright position, for instance, with both feet substantially in line. In this position, the rolling member 27 is in locked position, having jammed in the guideway, and consequently relative movement of the thigh and leg members is eliminated. In this position, the face 33 is in engagement with the face 35 and the knee cannot pivot rearwardly. Should the wearer now take a normal forward step with the artificial leg—which normally involves lifting the artificial leg forwardly, which action is illustrated in the left dotted member of Fig. 5—the rolling member in this position still remains in engagement with the lock. The next motion of the wearer is to set the artificial limb upon the floor, and, as he takes a step forward with the other leg and raises the artificial leg by lifting the heel thereof (see right illustration of Fig. 5), the angle of inclination of the guideway 22 changes and the rolling member rolls forwardly, unlocking the knee joint. The user is then in the position where the artificial leg can be bent at the knee (see Fig. 3) and the weight of the wearer distributed to both limbs. When the user takes the next step, by advancing the artificial limb, he ultimately brings the artificial limb to the position in which the guideway 22 assumes a rearward inclination and the rolling member 27 moves to locking position as the artificial limb is straightened out as shown in the left dotted figure of Fig. 5. It is evident, therefore, that continued action such as described, will permit the user to walk and the mechanism will function automatically.

When it is desirable to sit, the user follows the normal procedure of throwing the body slightly forward, which inclines the guideway, releasing the lock, whereupon the knee of the artificial limb is free to bend as the user seats himself. It is also evident that a rearward step can be taken, thus, for instance, as is shown in the two positions, the central position of Fig. 5 and the right dotted figure of Fig. 4.

The invention in Figs. 6–10 is shown in association with a brace, for an individual who is required to wear braces upon the lower limbs because of the improper functioning of such limbs. Figs. 6 and 7 illustrate a conventional brace to which the invention is applied. The brace consists of the two lower frame members 36 and the two upper frame members 37 which are usually made adjustable as at 38. The lower portion of the member 36 has an arch rest 39 and the members 36 and 37 are provided with a series of securing members 40 for attaching the brace to the human leg. The locking mechanism of this invention is incorporated in the portion of the brace which corresponds to the knee of the user and divides the brace into a thigh member 41 and a leg member 42. The locking member is provided between the two sets of frame members 36, 37 and it is therefore necessary to describe but one of the locks inasmuch as the other is of the same construction and, in their operation, the two locks synchronize.

The lower frame member 36 is provided with an outwardly flaring head 43 and with a flat top surface 44 (see Figs. 8, 9 and 10). The flaring head 43 has plates 45, 46 arranged on each side thereof; said plates being provided with a semicircular extension 47. The plates 45, 46 are secured to the lower frame 36 by rivets 49. The upper frame member 37 is provided with a bottom straight flat face 50 which corresponds to the flat top 44 and the top faces 44 and 50 are spaced apart to provide a channel 51. The upper frame member 37 is provided with two plates 52, 53 secured by rivets 49 to the lower portion of the frame member 37. These plates have flaring portions 54 provided at the lower end thereof with semi-circular recessed faces, machined to the same arc as the circular extension 47. The lower end of the upper frame member 37 between the plates 52 and 53 has the same contour as the said plates, excepting that the lower face is flat and straight in order to provide the channel 51 between the two flat portions of the oppositely positioned flat top 44 and the flat face 50. The inside faces of the plates 45 and 46 in the region where they cover the channel 51 are provided with semi-circular grooves 56, thereby giving the channel 51 a circular configuration in cross-section. The semi-circular extensions 47 fit into the semi-circular recesses of the plates 52 and 53 and a bolt 57 passes through aligned apertures in the extensions 47 and the lower portion of the upper frame member 37, providing a pivot or knee action upon which the upper and lower frame members 36 and 37 may move. It is not desirable that the members 36 and 37 move forwardly and consequently the plates 45—46 and 52—53 are provided with abutments 58 which engage when the members 36 and 37 are in substantial vertical relation.

A semi-circular guideway 22 is positioned in the channel 51 secured therein by the bolt 59 passing through aligned apertures in the plates 45—46 and in the side walls 60 of the guideway 22. A rolling member 27 is free to move in the guideway 22, the guideway being set at a slight rearward inclination in order that the rolling member will be positioned at the low end of the guideway when the frame members 36 and 37 are in alignment. In order to permit slight adjustment of the guideway 22 in the channel 51, oppositely arranged, elongated slots 61 are provided in the plates 45 and 46 for adjustment of the channel and the bolt 59. The end of the guideway is provided with lips 62 in order to keep the rolling member 27 from passing out of the guideway at one end and the bolt 59 acts as a stop to retain the rolling member from escape at the opposite end.

When the brace is worn by a person and he stands in an upright position, in which the frame members 36 and 37 assume the position in Fig. 8, the rolling member 27 is at the low side of the guideway, which rests upon the flat top 44, and jams between the bottom of the guideway and the flat face 50. Consequently, the members 36 and 37 are locked from moving rearwardly. The members 36 and 37 cannot move forwardly because of the engagement of the two abutments 58. In consequence, the wearer's legs are braced against movement at the knee in either a forward or rearward direction.

Should the wearer then take a forward step in the same manner as set forth in connection with the operation of Fig. 5, the change in the inclination of the guideway 22 causes the rolling member to roll from out of its jamming position and permits bending at the knee action, as illustrated in Fig. 10.

Figs. 11-16 show two modifications of the invention in association with a different type of artificial limb, the artificial limb per se being known and in use and in connection with which this invention is illustrated.

The thigh member 1 and the leg member 2 are secured together by a bolt 63, which bolt is fast to the outer bearings of the leg member 2 in order that the bolt rotates with the said leg member, said bolt 63 providing a pivot on which the two members may have relative motion. The bolt is hung in brackets 64 secured to the solid lower portion 65 of the thigh member 1. An arm 66 having an integral sleeve 67 is mounted on the bolt 63. The upstanding post 68 fast to the arm 66, is secured by a bracket 69 to the inside of the leg portion 2. The arm 66 and the post 68 act as stops in order that there should be no forward movement of the knee action from the vertical position shown in Figs. 11 and 14 when the top side of the arm 66 engages the rubber cushion 70.

In Figs. 11-13, the locking member is shown incorporated in the bolt or pivot 63. An inclined guideway 22 is drilled crosswise in the bolt, in which the rolling member 27 is adapted to move. An angular plate locking member 71 is carried on the thigh member 65 and secured thereto by one of the brackets 64, which member 71 is provided with a lip 72, which secures the rolling member 27 from escape from the guideway 22 and is also provided with a flat face 73. When the rolling member 27 is in the position shown in Fig. 11, in which position the thigh member 1 and leg member 2 are vertically arranged, the rolling member 27 jams between the edge 74 and the face 73, locking the members 1 and 2 against relative movement in a rearward direction. In the same position, the arm 66 secures the knee from moving in a rearward direction.

The user, following the description in connection with Fig. 5, may stand upright with the feet in line with the knee action locked against relative movement of the thigh member and the leg member 2. Should the user then, simulate walking, as set forth in connection with Fig. 5, the inclination of the guideway 22 will reverse and the rolling member 27 will move out of its jamming position and permit knee action, as is generally illustrated in Fig. 13.

In Figs. 14-16, a further modification of the invention is shown in connection with the type of artificial limb shown in Figs. 11-13. In this further modification, the thigh member 1 has a hinge bracket 75 secured to an inner wall thereof. Said bracket 75 freely supports a link 76 which is free to swing somewhat like a pendulum as the relative position of the thigh member 1 and the leg member 2 changes. A frame 77 is secured within the hollow leg 2 by the bolts 78—79 passing through the end walls 80—81, which are integral parts of the frame 77. A guideway 22 is carried by the frame 77 and beneath the link 76. The guideway comprises two side walls 82—83, each having elongated slots 84 formed therein. A rolling member in the form of a cylindrical member 85 is arranged in the slots 84, supported on the under wall of the slots, whereon it is free to roll. The roller 85 is provided with a head 86 on one side and a washer 87 and nut 88 on the other to keep the roller from escaping from the slots and to guide it in its movement along the slot. The guideway 22 is set at a slight angle in order to move the roller underneath the link 76 when the thigh member 1 and the leg member 2 are in vertical position as shown in Fig. 14. The guidepin 48 limits the movement of the link 76 and guides the link in its sliding motion through the path of the rolling member.

When the roller 85 is in the position shown in Fig. 14, in which position the thigh member 1 and leg member 2 are vertically arranged, the roller 85 is beneath the arm 76, which arm 76 is in a vertical position, jamming against the top face of the roller, locking the members 1 and 2 against relative movement in a rearward direction. In the same position, the arm 66 secures the knee from moving in a rearward direction.

The user following the description in connection with Fig. 5, may stand upright with the feet close together and the knee action is locked against relative movement of the thigh member and the leg member 2. Should the user then raise the artificial limb with the usual initial characteristic motion, the roller 85 will remain in locked position inasmuch as the inclination of the guideway is rearwardly. As the user, in walking, inclines the artificial limb as illustrated in the right figure of Fig. 5, the inclination of the guideway reverses (from the position shown in the other two illustrations of Fig. 5) and the roller will move to unlocking position and the knee action may function as shown in Fig. 16.

The roller will again move to locking position when the limb assumes a position as illustrated in the middle figure of Fig. 5.

The foregoing cycle of operations is repeated automatically as the wearer walks.

If desired, the inner face of the guideway 22 may be lined with a resilient material such as rubber which, however, should be of such character as not to interfere with the rolling member moving freely in the guideway or performing its locking function.

I claim:

1. In a device, as an aid for walking, thigh and leg members, a knee action connecting said members, a lock associated with said knee action, said lock including a rolling member in the form of a bearing adapted to reciprocate and in one position, at the end of its pathway, locking the knee action against movement and moving to unlocking position upon the inclination of its pathway in a reverse direction.

2. In a device, as an aid for walking, in combination, a thigh and leg arranged for relative movement, a lock comprising a guideway, a movable member in the guideway, said movable member being adapted to change its position as the inclination of the lock is changed, the movable member engaging between surfaces to secure the lock and moving away from said surfaces to disengage the lock.

3. In a device, as an aid for walking, a knee action connecting the thigh and leg to permit relative bending between said members, a lock controlling the knee action and locking the same when the wearer stands in upright position, said lock including a guideway and a rolling member adapted to reciprocate in said guideway, said rolling member entering between a surface associated with said thigh member and a surface associated with said leg member and locking the knee action against movement, said rolling member when the guideway is inclined forwardly moving from locking position and freeing the knee action to permit relative movement between the thigh and leg.

4. In a device, as an aid for walking, in combination, a thigh and leg arranged for relative movement to permit operation thereof in step by step sequence, a lock comprising a guideway, a movable member having reciprocating movement in the guideway, said movable member moving to locking position when the thigh and leg are substantially in vertical alignment and moving to unlocking position when the thigh and leg are tilted forwardly.

5. A device, as an aid for walking comprising a thigh and leg connected together to permit relative movement of said thigh and leg, a guideway, a member in the guideway adapted to move therein by the change in angular position of said limb, said member locking the thigh and leg against relative movement in one position and unlocking said thigh and leg when moved to another position.

6. In a device, as an aid for walking, in combination, a thigh and leg, a knee hinge to permit relative movement of the leg with respect to the thigh during step by step walking, a lock comprising a guideway normally inclined rearwardly of the limb, a rolling member adapted to move in the guideway and normally assume a position on the low side of the normally inclined guideway, surfaces positioned in the path of the rolling member, between which surfaces said rolling member moves and locks the thigh and leg against relative movement, said rolling member, upon a forward step, inclining the guideway in the direction opposite to its normal inclination and moving from locking position to unlocking position to permit relative movement of the thigh and leg.

7. An artificial limb comprising thigh and leg members, a knee action connecting the said members, a lock comprising a guideway carried by one of said members, a rolling member in the guideway, abutments on said members, said rolling member being adapted to roll between said abutments and lock the knee action.

8. An artificial limb according to claim 7, in which the guideway is carried by a pivoted backstop and the rolling member reciprocates in said guideway to locking and unlocking position as the angle of said backstop changes during step by step walking action.

9. In a device, as an aid for walking, a thigh and leg, a knee action connecting the same, a stop to limit the movement of the knee action in a rearward direction, a lock to secure the knee action against forward movement when the wearer stands upright, whereby the wearer is supported in an upright position by the knee action being locked against movement in either direction, said lock including a guideway associated with the knee action, said guideway being adapted to change its inclination as the inclination of the knee action is changed, a rolling member in the guideway, said rolling member being in locking position when the wearer stands upright and rolling to unlocking position when the knee action is inclined during step by step walking action.

GEORGE A. HINKLE.